US011681015B2

(12) United States Patent
Foroozesh et al.

(10) Patent No.: US 11,681,015 B2
(45) Date of Patent: Jun. 20, 2023

(54) WAVEGUIDE WITH SQUINT ALTERATION

(71) Applicant: Aptiv Technologies Limited, St. Michael (BB)

(72) Inventors: Alireza Foroozesh, Los Angeles, CA (US); Shawn Shi, Thousand Oaks, CA (US)

(73) Assignee: Aptiv Technologies Limited, St. Michael (BB)

( * ) Notice: Subject to any disclaimer, the term of this patent is extended or adjusted under 35 U.S.C. 154(b) by 100 days.

(21) Appl. No.: 17/205,710

(22) Filed: Mar. 18, 2021

(65) Prior Publication Data

US 2022/0196794 A1 Jun. 23, 2022

Related U.S. Application Data

(60) Provisional application No. 63/127,873, filed on Dec. 18, 2020.

(51) Int. Cl.
*G01S 7/28* (2006.01)
*G01S 7/40* (2006.01)
*G01S 13/931* (2020.01)

(52) U.S. Cl.
CPC .......... *G01S 7/2813* (2013.01); *G01S 7/4026* (2013.01); *G01S 7/403* (2021.05); *G01S 13/931* (2013.01)

(58) Field of Classification Search
CPC ...... G01S 7/2813; G01S 7/4026; G01S 7/403; G01S 13/931; H01Q 21/0043
See application file for complete search history.

(56) References Cited

U.S. PATENT DOCUMENTS 3,328,800 A 6/1967 Algeo
3,462,713 A 8/1969 Knerr
(Continued)

FOREIGN PATENT DOCUMENTS

CA 2654470 12/2007
CN 1620738 5/2005
(Continued)

OTHER PUBLICATIONS

"CPW Center-Fed Single-Layer SIW Slot Antenna Array for Automotive Radars", IEEE Transactions on Antennas and Prorogation, Jun. 12, 2014, pp. 4528-4536, DOI:10.1109/TAP.2014.2330587 by Xu Junfeng, hereinafter Xu (Year: 2014).*
(Continued)

*Primary Examiner* — Erin F Heard
*Assistant Examiner* — Kenneth W Good
(74) *Attorney, Agent, or Firm* — Sawtooth Patent Group PLLC

(57) ABSTRACT

This document includes techniques, apparatuses, and systems related to a waveguide with squint alteration, which can improve electromagnetic wave operation. In aspects, squint of electromagnetic waves pertaining to waveguides may be altered and improved. In this example, the techniques also enable the waveguide to direct electromagnetic waves according to respective chambers and one or more apertures, improving the quality of signals transmitted and received. The chambers may be divided according to a divider extending toward an opening of the waveguide, directing electromagnetic waves between the opening and the one or more apertures.

20 Claims, 7 Drawing Sheets

(56) References Cited

U.S. PATENT DOCUMENTS

| | | | |
|---|---|---|---|
| 3,579,149 A | 5/1971 | Ramsey | |
| 3,594,806 A | 7/1971 | Black et al. | |
| 4,157,516 A | 6/1979 | van de Grijp | |
| 4,291,312 A | 9/1981 | Kaloi | |
| 4,453,142 A | 6/1984 | Murphy | |
| 4,562,416 A | 12/1985 | Sedivec | |
| 4,590,480 A | 5/1986 | Nikolayuk et al. | |
| 5,030,965 A | 7/1991 | Park et al. | |
| 5,047,738 A | 9/1991 | Wong et al. | |
| 5,638,079 A | 6/1997 | Kastner et al. | |
| 5,982,256 A | 11/1999 | Uchimura et al. | |
| 5,986,527 A | 11/1999 | Ishikawa et al. | |
| 6,166,701 A | 12/2000 | Park et al. | |
| 6,489,855 B1 | 12/2002 | Kitamori et al. | |
| 6,794,950 B2 | 9/2004 | du Tolt et al. | |
| 6,867,660 B2 | 3/2005 | Kitamori et al. | |
| 6,958,662 B1 * | 10/2005 | Salmela | H01P 5/107 333/33 |
| 7,091,919 B2 | 8/2006 | Bannon | |
| 7,973,616 B2 | 7/2011 | Shijo et al. | |
| 7,994,879 B2 | 8/2011 | Kim et al. | |
| 8,013,694 B2 | 9/2011 | Hiramatsu et al. | |
| 8,089,327 B2 | 1/2012 | Margomenos et al. | |
| 8,159,316 B2 | 4/2012 | Miyazato et al. | |
| 8,576,023 B1 | 11/2013 | Buckley et al. | |
| 8,604,990 B1 | 12/2013 | Chen et al. | |
| 8,692,731 B2 | 4/2014 | Lee et al. | |
| 9,007,269 B2 | 4/2015 | Lee et al. | |
| 9,450,281 B2 | 9/2016 | Kim | |
| 9,673,532 B2 | 6/2017 | Cheng et al. | |
| 9,882,288 B2 | 1/2018 | Black et al. | |
| 9,935,065 B1 | 4/2018 | Baheti et al. | |
| 10,186,787 B1 | 1/2019 | Wang et al. | |
| 10,283,832 B1 | 5/2019 | Chayat et al. | |
| 10,468,736 B2 | 11/2019 | Mangaiahgari | |
| 10,613,216 B2 | 4/2020 | Vacanti et al. | |
| 10,775,573 B1 | 9/2020 | Hsu et al. | |
| 10,833,385 B2 | 11/2020 | Mangaiahgari et al. | |
| 10,944,184 B2 | 3/2021 | Shi et al. | |
| 11,349,220 B2 | 5/2022 | Alexanian et al. | |
| 11,444,364 B2 | 9/2022 | Shi | |
| 2002/0021197 A1 | 2/2002 | Elco | |
| 2004/0069984 A1 | 4/2004 | Estes et al. | |
| 2004/0090290 A1 | 5/2004 | Teshirogi et al. | |
| 2005/0237253 A1 | 10/2005 | Kuo et al. | |
| 2006/0113598 A1 | 6/2006 | Chen et al. | |
| 2007/0013598 A1 | 1/2007 | Artis et al. | |
| 2007/0103381 A1 | 5/2007 | Upton | |
| 2008/0129409 A1 | 6/2008 | Nagaishi et al. | |
| 2008/0150821 A1 | 6/2008 | Koch et al. | |
| 2009/0207090 A1 | 8/2009 | Pettus et al. | |
| 2009/0243762 A1 | 10/2009 | Chen et al. | |
| 2010/0321265 A1 | 12/2010 | Yamaguchi et al. | |
| 2011/0181482 A1 | 7/2011 | Adams et al. | |
| 2012/0013421 A1 | 1/2012 | Hayata | |
| 2012/0050125 A1 | 3/2012 | Leiba et al. | |
| 2012/0056776 A1 | 3/2012 | Shijo et al. | |
| 2012/0068316 A1 | 3/2012 | Ligander | |
| 2012/0163811 A1 | 6/2012 | Doany et al. | |
| 2012/0194399 A1 | 8/2012 | Bily et al. | |
| 2012/0242421 A1 | 9/2012 | Robin et al. | |
| 2012/0256796 A1 | 10/2012 | Leiba | |
| 2012/0280770 A1 | 11/2012 | Abhari et al. | |
| 2013/0057358 A1 | 3/2013 | Anthony et al. | |
| 2013/0082801 A1 | 4/2013 | Rofougaran et al. | |
| 2013/0300602 A1 | 11/2013 | Zhou et al. | |
| 2014/0015709 A1 | 1/2014 | Shijo et al. | |
| 2014/0091884 A1 | 4/2014 | Flatters | |
| 2014/0106684 A1 | 4/2014 | Burns et al. | |
| 2015/0097633 A1 | 4/2015 | Devries et al. | |
| 2015/0229017 A1 | 8/2015 | Suzuki et al. | |
| 2015/0357698 A1 | 12/2015 | Kushta | |
| 2015/0364804 A1 | 12/2015 | Tong et al. | |
| 2015/0364830 A1 | 12/2015 | Tong et al. | |
| 2016/0043455 A1 | 2/2016 | Seler et al. | |
| 2016/0049714 A1 | 2/2016 | Ligander et al. | |
| 2016/0056541 A1 | 2/2016 | Tageman et al. | |
| 2016/0118705 A1 | 4/2016 | Tang et al. | |
| 2016/0126637 A1 | 5/2016 | Uemichi | |
| 2016/0195612 A1 | 7/2016 | Shi | |
| 2016/0204495 A1 | 7/2016 | Takeda et al. | |
| 2016/0276727 A1 * | 9/2016 | Dang | H01Q 1/50 |
| 2016/0293557 A1 | 10/2016 | Topak et al. | |
| 2016/0301125 A1 | 10/2016 | Kim et al. | |
| 2017/0003377 A1 * | 1/2017 | Menge | H01P 3/121 |
| 2017/0012335 A1 | 1/2017 | Boutayeb | |
| 2017/0084554 A1 | 3/2017 | Dogiamis et al. | |
| 2017/0288313 A1 | 10/2017 | Chung et al. | |
| 2017/0324135 A1 | 11/2017 | Blech et al. | |
| 2018/0123245 A1 | 5/2018 | Toda et al. | |
| 2018/0131084 A1 | 5/2018 | Park et al. | |
| 2018/0226709 A1 | 8/2018 | Mangaiahgari | |
| 2018/0233465 A1 | 8/2018 | Spella et al. | |
| 2018/0284186 A1 | 10/2018 | Chadha et al. | |
| 2018/0301819 A1 | 10/2018 | Kirino et al. | |
| 2018/0301820 A1 | 10/2018 | Bregman et al. | |
| 2018/0343711 A1 | 11/2018 | Wixforth et al. | |
| 2018/0351261 A1 | 12/2018 | Kamo et al. | |
| 2019/0006743 A1 | 1/2019 | Kirino et al. | |
| 2019/0013563 A1 | 1/2019 | Takeda et al. | |
| 2019/0057945 A1 | 2/2019 | Maaskant et al. | |
| 2019/0109361 A1 | 4/2019 | Ichinose et al. | |
| 2019/0115644 A1 | 4/2019 | Wang et al. | |
| 2019/0245276 A1 | 8/2019 | Li et al. | |
| 2019/0252778 A1 | 8/2019 | Duan | |
| 2019/0260137 A1 | 8/2019 | Watanabe et al. | |
| 2020/0021001 A1 | 1/2020 | Mangaiahgairi | |
| 2020/0044360 A1 | 2/2020 | Kamo et al. | |
| 2020/0076086 A1 | 3/2020 | Cheng et al. | |
| 2020/0106171 A1 | 4/2020 | Shepeleva et al. | |
| 2020/0203849 A1 * | 6/2020 | Lim | H01P 5/12 |
| 2020/0212594 A1 | 7/2020 | Kirino et al. | |
| 2020/0235453 A1 | 7/2020 | Lang | |
| 2020/0287293 A1 | 9/2020 | Shi et al. | |
| 2020/0319293 A1 * | 10/2020 | Kuriyama | G01S 13/93 |
| 2020/0343612 A1 | 10/2020 | Shi | |
| 2021/0028528 A1 | 1/2021 | Alexanian et al. | |
| 2021/0036393 A1 | 2/2021 | Mangaiahgari | |
| 2021/0218154 A1 | 7/2021 | Shi et al. | |
| 2021/0242581 A1 | 8/2021 | Rossiter et al. | |

FOREIGN PATENT DOCUMENTS

| | | | |
|---|---|---|---|
| CN | 2796131 | | 7/2006 |
| CN | 201383535 | | 1/2010 |
| CN | 102157787 | A | 8/2011 |
| CN | 102420352 | A | 4/2012 |
| CN | 103515682 | | 1/2014 |
| CN | 104900956 | | 9/2015 |
| CN | 105609909 | | 5/2016 |
| CN | 105680133 | | 6/2016 |
| CN | 105958167 | | 9/2016 |
| CN | 109980361 | A | 7/2019 |
| CN | 209389219 | | 9/2019 |
| DE | 112017006415 | | 9/2019 |
| DE | 102019200893 | | 7/2020 |
| EP | 2267841 | A1 | 12/2010 |
| EP | 2500978 | | 9/2012 |
| EP | 2843758 | | 3/2015 |
| EP | 3460903 | | 3/2019 |
| EP | 4089840 | A1 | 11/2022 |
| GB | 2463711 | A | 3/2010 |
| GB | 2489950 | | 10/2012 |
| JP | 2003289201 | | 10/2003 |
| JP | 2013187752 | A | 9/2013 |
| KR | 100846872 | | 5/2008 |
| KR | 20080044752 | A | 5/2008 |
| KR | 101092846 | B1 | 12/2011 |
| WO | WO-9934477 A1 * | | 7/1999 ......... H01Q 21/0043 |

(56) References Cited

FOREIGN PATENT DOCUMENTS

| WO | 2013189513 | 12/2013 |
|---|---|---|
| WO | 2018003932 | 1/2018 |

OTHER PUBLICATIONS

"CPW Center-Fed Single-Layer SIW Slot Antenna Array for Automotive Radars", IEEE Transactions on Antennas and Propogation, Jun. 12, 2014, pp. 4528-4536, DOI:10.1109/TAP.2014.2330587 by Xu Junfeng, hereinafter Xu (Year: 2014).*
"Extended European Search Report", EP Application No. 21211165.2, dated May 13, 2022, 12 pages.
"Extended European Search Report", EP Application No. 21211167.8, dated May 19, 2022, 10 pages.
"Extended European Search Report", EP Application No. 21211168.6, dated May 13, 2022, 11 pages.
"Extended European Search Report", EP Application No. 21211452.4, dated May 16, 2022, 10 pages.
"Extended European Search Report", EP Application No. 21211478.9, dated May 19, 2022, 10 pages.
Alhuwaimel, et al., "Performance Enhancement of a Slotted Waveguide Antenna by Utilizing Parasitic Elements", Sep. 7, 2015, pp. 1303-1306.
Li, et al., "Millimetre-wave slotted array antenna based on double-layer substrate integrated waveguide", Jun. 1, 2015, pp. 882-888.
Mak, et al., "A Magnetoelectric Dipole Leaky-Wave Antenna for Millimeter-Wave Application", Dec. 12, 2017, pp. 6395-6402.
Mallahzadeh, et al., "A Low Cross-Polarization Slotted Ridged SIW Array Antenna Design With Mutual Coupling Considerations", Jul. 17, 2015, pp. 4324-4333.
Rossello, et al., "Substrate Integrated Waveguide Aperture Coupled Patch Antenna Array for 24 GHz Wireless Backhaul and Radar Applications", Nov. 16, 2014, 2 pages.
Shehab, et al., "Substrate-Integrated-Waveguide Power Dividers", Oct. 15, 2019, pp. 27-38.
Wu, et al., "A Planar W-Band Large-Scale High-Gain Substrate-Integrated Waveguide Slot Array", Feb. 3, 2020, pp. 6429-6434.
Xu, et al., "CPW Center-Fed Single-Layer SIW Slot Antenna Array for Automotive Radars", Jun. 12, 2014, pp. 4528-4536.
"Foreign Office Action", CN Application No. 201810122408.4, dated Oct. 18, 2021, 19 pages.
"Non-Final Office Action", U.S. Appl. No. 16/829,409, filed Oct. 14, 2021, 13 pages.
"Non-Final Office Action", U.S. Appl. No. 17/061,675, filed Dec. 20, 2021, 4 pages.
Wang, et al., "Mechanical and Dielectric Strength of Laminated Epoxy Dielectric Graded Materials", Mar. 2020, 15 pages.
"Extended European Search Report", EP Application No. 18153137.7, dated Jun. 15, 2018, 8 pages.
"Extended European Search Report", EP Application No. 20166797, dated Sep. 16, 2020, 11 pages.
"Foreign Office Action", CN Application No. 201810122408.4, dated Jun. 2, 2021, 15 pages.
"Non-Final Office Action", U.S. Appl. No. 16/583,867, filed Feb. 18, 2020, 8 pages.
"Non-Final Office Action", U.S. Appl. No. 15/427,769, filed Nov. 13, 2018, 8 pages.
"Notice of Allowance", U.S. Appl. No. 15/427,769, filed Jun. 28, 2019, 9 pages.
"Notice of Allowance", U.S. Appl. No. 16/583,867, filed Jul. 8, 2020, 8 Pages.
Jankovic, et al., "Stepped Bend Substrate Integrated Waveguide to Rectangular Waveguide Transitions", Jun. 2016, 2 pages.
"WR-90 Waveguides", Pasternack Enterprises, Inc., 2016, Retrieved from https://web.archive.org/web/20160308205114/http://www.pasternack.com:80/wr-90-waveguides-category.aspx, 2 pages.
Gray, et al., "Carbon Fibre Reinforced Plastic Slotted Waveguide Antenna", Proceedings of Asia-Pacific Microwave Conference 2010, pp. 307-310.
"Extended European Search Report", EP Application No. 20155296.5, dated Jul. 13, 2020, 12 pages.
"Foreign Office Action", CN Application No. 202010146513.9, dated Feb. 7, 2022, 14 pages.

* cited by examiner

WAVEGUIDE WITH SQUINT ALTERATION

CROSS-REFERENCE TO RELATED APPLICATION

This application claims the benefit under 35 U.S.C. 119(e) of U.S. Provisional Application No. 63/127,873, filed Dec. 18, 2020, the disclosure of which is incorporated by reference in its entirety herein.

BACKGROUND

Some automobiles use radar and other devices that emit electromagnetic signals to detect and track objects. The electromagnetic signals are transmitted and received using one or more antennas. An antenna may be characterized in terms of pattern, which is a measure of realized gain as a function of direction. A precisely controlled pattern improves detections of other automobiles or pedestrians at narrow field of elevation, for example. In some instances, manufacturing defects may negatively affect pattern control, requiring manufacturers to discard out-of-tolerance antennas. As an example, manufacturing defects may cause pattern squinting, which can offset the realized pattern from those intended by the design and reduce precision. Squint tolerances may be on the order of tenths of degrees, requiring specific attention from designers and architects.

SUMMARY

This document describes techniques, apparatuses, and systems for a waveguide with squint alteration. A waveguide is described that defines an opening and an aperture. The opening is configured to cooperate with a coupling; the aperture is exposed to an environment of the waveguide. The waveguide includes a conductor having a substantially uniform potential with respect to a reference potential defining an electromagnetic boundary. The electromagnetic boundary is arranged to bound electromagnetic fields between the opening and the aperture. The electromagnetic boundary is configured to define a divider extending toward the opening to divide the electromagnetic boundary into a first chamber and a second chamber. In this way, the waveguide provides a pattern that alters the squint of the waveguide. The squint may be reduced and more normal with respect to the antenna plane.

This document also describes other configurations and systems for providing squint alteration and other pattern-improvement techniques.

This Summary introduces simplified concepts related to squint alternation and other pattern improvement techniques for waveguides, which are further described below in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of waveguide with squint alteration are described in this document with reference to the following drawings. The same numbers may be used throughout the drawings to reference like features and components.

DETAILED DESCRIPTION

Overview

Figure 1:
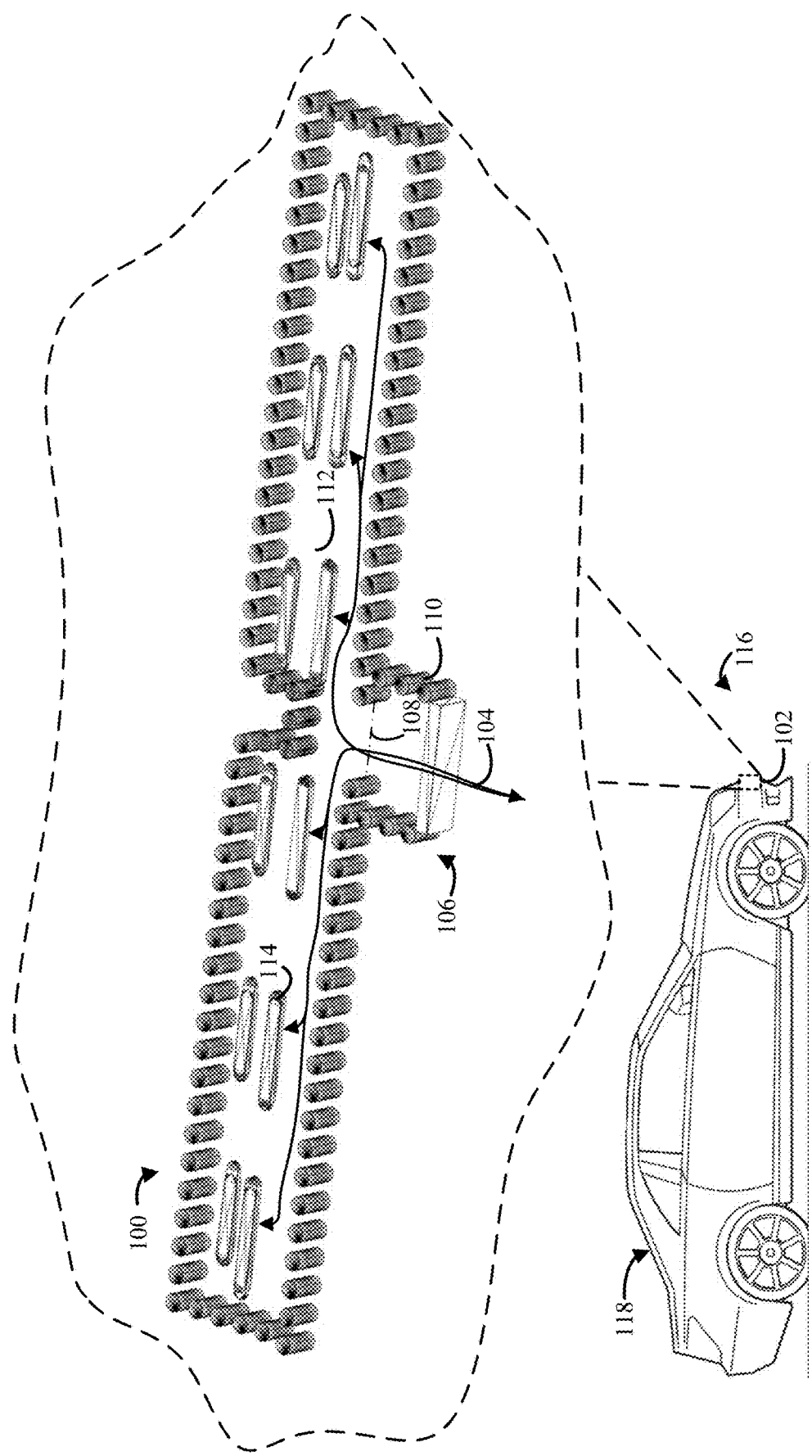
FIG. 1 illustrates an example waveguide according to a cross-sectional plan view, in accordance with one or more implementations of the present disclosure.

Electromagnetic systems are a common sensing technology used in many industries, including the automotive industry, acquiring information about the surrounding environment or transceiving data. An antenna, such as one described herein, may be employed in such systems to transmit and receive electromagnetic signals. A radar system may use multiple antenna elements in an array to provide increased gain and directivity over what can be achieved using a single antenna element. As described herein, signals from the individual elements are combined with appropriate phases and weighted amplitudes to provide a desired antenna-reception pattern during reception. The antenna arrays are also used in transmission, splitting signal power amongst the elements, using appropriate phases and weighted amplitudes to provide a desired antenna-transmission pattern during transmission.

Consider, for example, a waveguide employed to transfer electromagnetic energy. The waveguide may include an opening, which may be associated with a coupling. As an example, the coupling may provide an additional conduit for controlling electromagnetic waves associated with the waveguide. The coupling may provide electromagnetic-field access between an aperture of the waveguide exposed to the environment and a probe associated with the waveguide for transceiving electromagnetic signals with transceiver circuitry. The aperture may be an array of slots, and the waveguide may bound electromagnetic waves between the aperture and the opening in a way to reduce squinting of the transmitted or received electromagnetic signals.

The waveguide can include an array of radiating slots of various shapes, which may be arranged to provide desired phasing, combining, or splitting of signals and energy. To provide equal power distribution, minimize squinting, and reduce signal error, the slots may be divided into groups. In an example, the waveguide may have a T-shape with slots divided into two different groups, one for each side of the T. As electromagnetic waves bounce down the coupling and through the waveguide, if the waves are allowed to unevenly distribute to one side or the other of the T, this can result in squinting the direction of the resulting beam. This squinting may cause uncertainty in detections and may be particularly detrimental in an automotive context (e.g., accurate detection of objects associated with a roadway). A way to ensure equal power distribution to prevent squinting and the negative effects associated with squinting is desired.

In this way, the present disclosure describes squint alteration associated with a waveguide. The wave guide may be defined in a T-shape and cooperate with a divider that act together to reduce squinting so as to equally divide or join the electromagnetic waves and prevent uneven distributions to one side or the other of the T. Application of this and other examples provided in this disclosure may increase radiation performance of a waveguide. These are but a few examples of how the described techniques and devices may be used to improve conventional waveguides.

Example Apparatus

In FIG. 1, an example waveguide 100, in accordance with one or more implementations of the present disclosure, is shown. The waveguide 100 is part of an apparatus 102. The apparatus 102 may include other components (e.g., probes, receivers, transmitters, transceivers) for communicating electromagnetic fields 104 and may be situated within a vehicle 118. In some implementations, the transceiver (not shown in FIG. 1) may be operable upon actuation to interact with electromagnetic waves or fields associated with the waveguide 100.

The transceiver may include one or more components, including a receiver, transmitter, or both. A coupling 106 is a link between the transceiver and the waveguide 100 that cooperates with an opening 108 defined by the waveguide 100, forming an antenna assembly. Examples of the coupling 106 may include a coaxial cable, conduit, various implements, or combinations thereof.

The waveguide 100 may be formed of various conductive portions, conductors, which may be conductive layers (shown in FIG. 2), and vias 110 conductively connecting the conductive layers about a substrate 112. The substrate 112 may be a dielectric. In the illustrated example, the waveguide 100 includes a plurality of vias 110, although for brevity and clarity, only one via 110 is designated. It should be appreciated that a conductive connection may correspond to various suitable electrical connections, including different application technologies and processes. Although many materials conduct to some degree, a conductive connection is one that is constructed or architected to conduct electrons, though electrons may not be routinely conducted. A conductive connection may include various associations of parts having, for example, a conductivity greater than 1.00 siemens per meter at 20 degrees centigrade (S/m at 20° C.) between the parts. Conductive connection does not necessarily require unitarily implemented conductors. Further, a conductive connection may include various suitable breaks and interruptions, including interconnections, switches, buffers, and other implements to provide conductive connections between two or more components. As such, a dielectric may include materials that have conductivities less than 1.00 S/m at 20° C.

The waveguide 100 may include an aperture 114 for conveying the electromagnetic fields 104 to an environment 116 of the waveguide 100. Although the aperture 114 is illustrated as one slot within FIG. 1, the aperture 114 may be defined by one or more slots, holes, openings, apertures, ports, various other defined shapes, or various combinations thereof. In one instance, the slots may have matching shapes and sizes. In another instance, at least one of the slots may be different in shape or size from another. The waveguide 100 may be situated in an environment 116 having an atmosphere or surroundings. As an example, the waveguide 100 may be situated within a bumper or exterior of a vehicle. The environment 116 may change, depending on the circumstances of its position. For instance, a vehicle traveling through inclement weather may have an environment 116 that is more parts water than a vehicle traveling through a desert.

Figure 2:
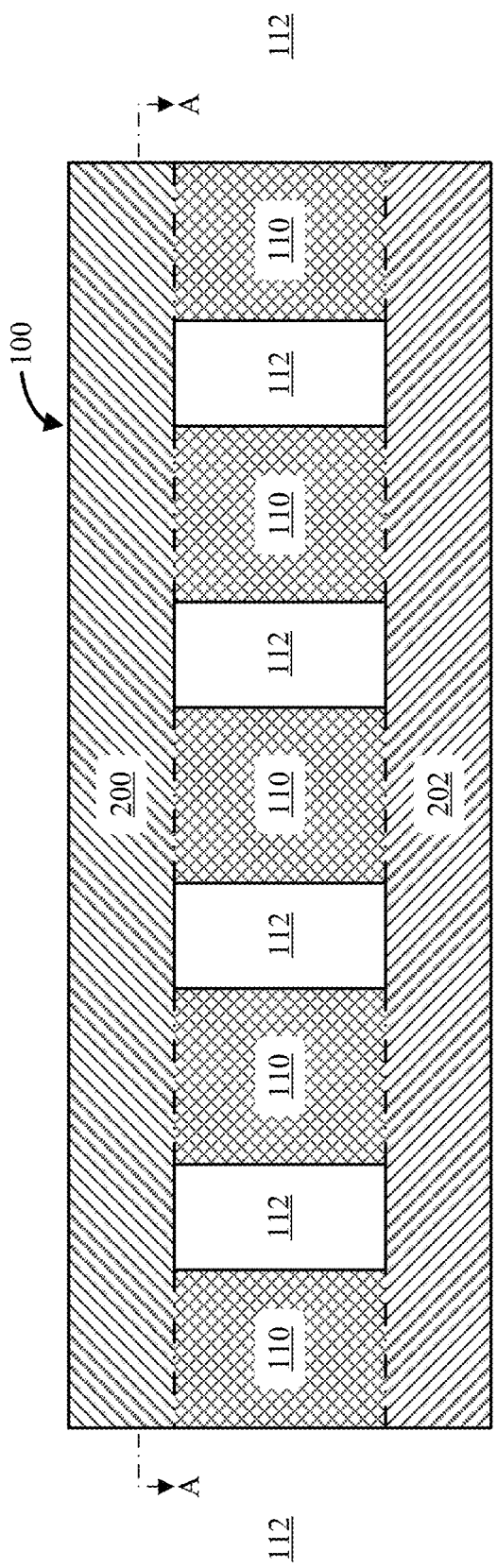
FIG. 2 illustrates a side view of an example waveguide, in accordance with one or more implementations of the present disclosure.

In FIG. 2, a side view of an example waveguide 100, in accordance with one or more implementations of the present disclosure, is shown. In aspects, the waveguide 100 may be formed on a substrate 112. Although omitted for clarity, the substrate 112 may extend beyond corresponding conductors that define the waveguide, and the substrate 112 may incorporate one or more additional waveguides. In the illustrated example, a first conductive layer 200 sandwiches the substrate 112 with a second conductive layer 202. In aspects, the substrate 112 may be substantially planar. During manufacturing, the first conductive layer 200 may be placed on one side of the substrate 112, and the second conductive layer 202 may be placed on the opposite side of the substrate 112. The first conductive layer 200 may then be conductively connected with the second conductive layer 202 by vias 110.

The vias 110 may be plated, solid, through-hole, blind, buried (as shown), tented, various other implements, or various combinations thereof. As such, the vias 110 conductively connect the first conductive layer 200 with the second conductive layer 202, forming a conductor that has a substantially uniform potential with respect to a reference potential. As an example, the substantially uniform potential may be common voltage with respect to ground, where ground is the reference potential. Various reference potentials may be used (e.g., 0.0, 3.3, 5.0, 12 Volts). The formed conductor comprising the vias 110, the first conductive layer 200, and the second conductive layer 202 may form an electromagnetic boundary (described further below with respect to FIG. 4) for electromagnetic fields 104 traveling within the substrate 112 of waveguide 100.

FIG. 2 illustrates cross-section A that depicts a cross-sectional plan view of the waveguide 100 and includes the first conductive layer 200 and second conductive layer 202. The cross-sectional plan views of FIGS. 1 and 3-5 omit the first conductive layer 200 for clarity while maintaining the aperture 114 or array of slots defined by the first conductive layer 200 to indicate relationships between other aspects defined by the waveguide 100. The cross-sectional plan view is not intended to depict aspects of the waveguide 100 to scale.

Figure 3:
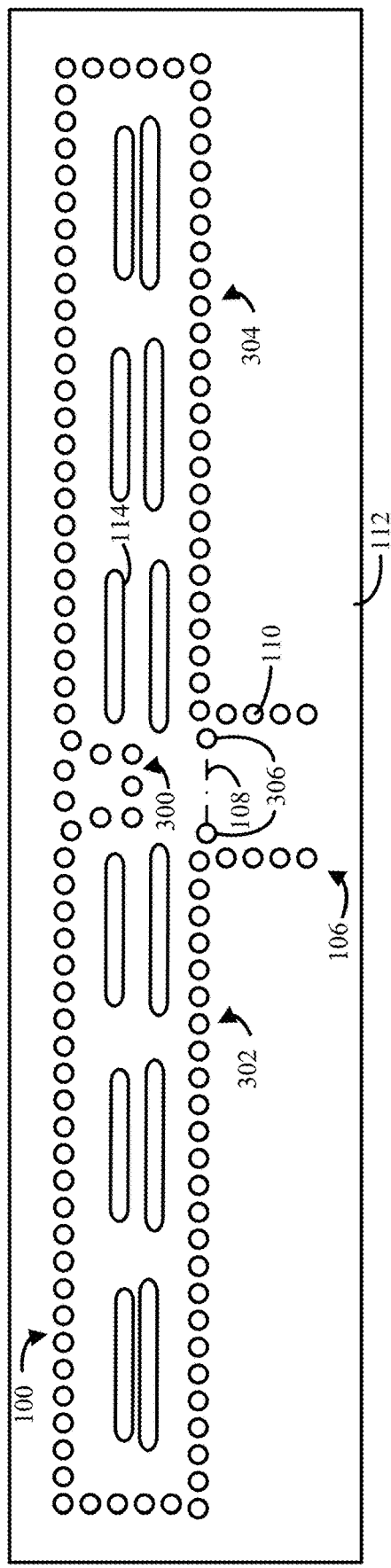
FIG. 3 illustrates a cross-sectional plan view of an example waveguide according to vias, in accordance with one or more implementations of the present disclosure.

Referring to FIG. 3, a cross-sectional plan view of an example waveguide 100 according to vias 110, in accordance with one or more implementations of the present disclosure, is shown. As shown, the vias 110 generally surround the aperture 114 and guide the electromagnetic fields 104 from the coupling 106 through the opening 108 to the aperture 114. A divider 300 may be defined by the vias 110 or another conductor to guide, split, or otherwise influence the electromagnetic fields 104 between the opening 108 and the aperture 114 through the substrate 112. In aspects, the divider 300 may define chambers for guiding the electromagnetic fields 104. For example, a first chamber 302 and a second chamber 304 are defined by the vias 110, the divider 300, the first conductive layer 200, and the second conductive layer 202 (as shown in combination with FIG. 2). Accordingly, one via 110 of a plurality of vias 110 is designated for brevity along with impedance-matching vias 306 that are configured to match an impedance associated with electromagnetic fields (e.g., electromagnetic fields 104 from FIG. 1) to reduce attenuation. For instance, the impedance-matching vias 306 may define the opening 108, and the divider 306 may have a dimension sized similar to that of the opening 108 to direct the electromagnetic fields 104 associated therewith.

Figure 4:
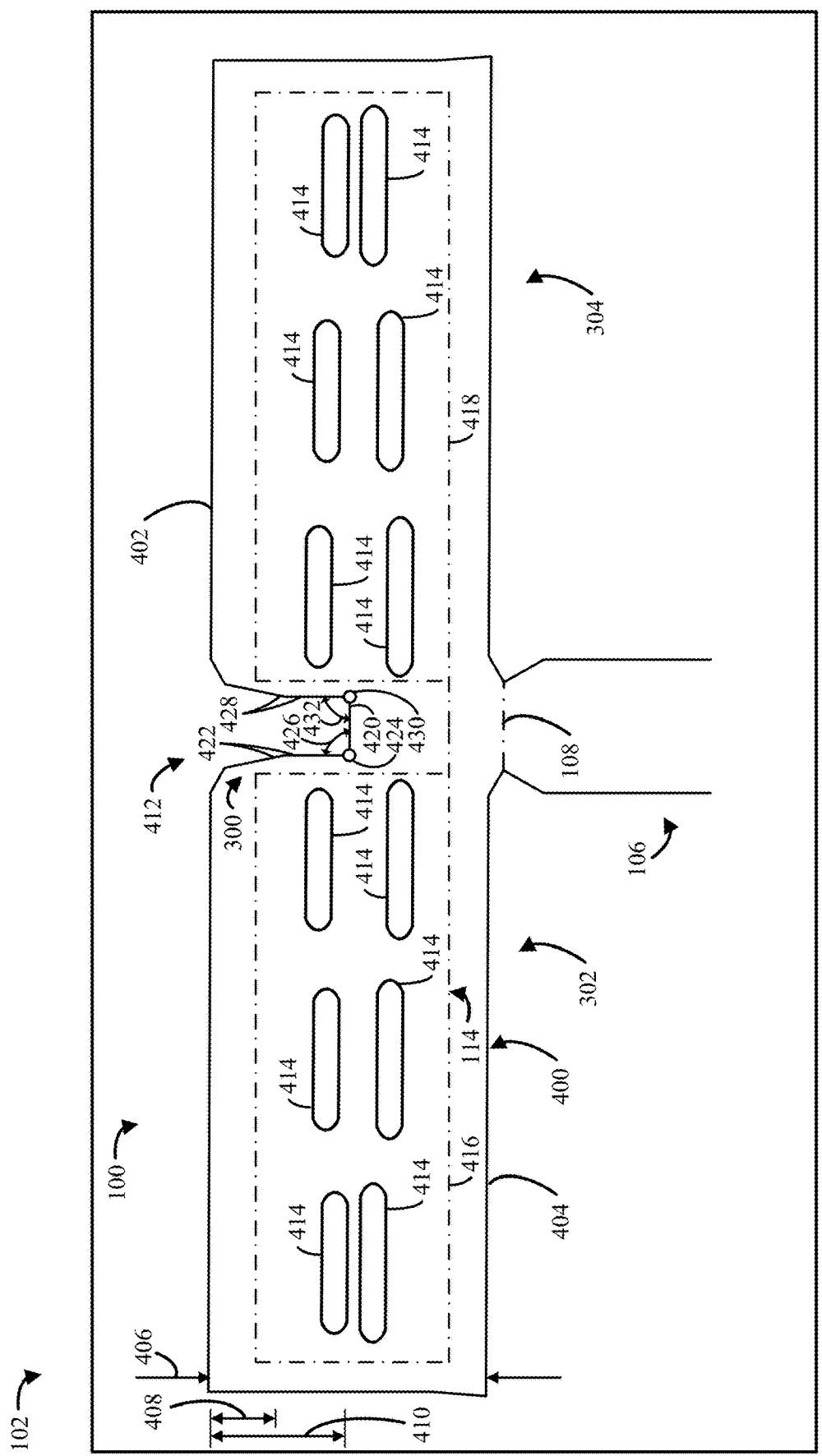
FIG. 4 illustrates a cross-sectional plan view of an example waveguide and electromagnetic boundary, in accordance with one or more implementations of the present disclosure.

Turning to FIG. 4, a cross-sectional plan view of an example waveguide 100 and an electromagnetic boundary 400, in accordance with one or more implementations of the present disclosure, is shown. The electromagnetic boundary 400 may be formed by the vias 110 (shown in FIGS. 1 and 3), the first conductive layer 200, and the second conductive layer 202. The electromagnetic boundary 400 may also be formed by one or more other components and various combinations thereof with various combinations of the vias 110, the first conductive layer 200, or the second conductive layer 202. The vias 110 may be intentionally spaced and optimized to reduce the amount of conductive material used while bounding the electromagnetic fields 104 (shown in FIG. 1). The electromagnetic boundary 400 may be arranged to bound electromagnetic fields 104 between the opening 108 and the aperture 114. The divider 300 may be defined by vias 110 or another conductor to direct electromagnetic fields 104 to the first chamber 302 and the second chamber 304. In some aspects, the divider 300 may extend toward the opening 108 to direct the electromagnetic fields 104. Extending toward the opening 108 may be at various angles with respect to the opening and refers to a general direction of the divider 300. In some implementations, the divider 300 may be oriented at angles non-perpendicular to the opening 108.

As illustrated, the electromagnetic boundary 400 may be substantially rectangular, having four major corners and four major sides. For example, the boundary 400 may include a first side 402 and a second side 404. The first side 402 may be opposite the second side 404. The first side 402 and the second side 404, or portions thereof, may be substantially parallel to one another or non-parallel to one another. The opening 108 may be substantially parallel to the second side 404. The opening 108 may overlap the second side 404 or be offset from the second side 404. In an example, the opening 108 may cooperate with the coupling 106 to convey the electromagnetic fields 104, and in one or more instances, the opening 108 may be narrower than the coupling 106 or portion thereof. As an example, the opening 108 may be defined between impedance-matching vias 306 to narrow the coupling 106. The electromagnetic boundary 400, although shown substantially rectangular, may be implemented in various forms and shapes having various quantities of sides, corners, and other features.

The divider 300 may extend from the first side 402 toward to the second side 404. The divider 300 may also extend from the first side 402 toward the opening 108. The divider 300 may be formed by vias 110. In aspects, the divider 300 may extend any suitable distance from the first side 402 toward the second side 404. In other aspects, depending on the shape or contour, the divider 300 may extend multiple different distances from the first side 402 or relative to the second side 404. A width 406 between the first side 402 and the second side 404 may be defined by the electromagnetic boundary 400. In implementations where the width 406 varies between the first side 402 and the second side 404, the width 406 may be defined as the maximum distance between the first side 402 and the second side 404. In such implementations, the divider 300 may extend any suitable distance (e.g., from the first side), relative to the maximum distance between the first side 402 and the second side 404. As an example, the divider 300 may extend beyond a first quartile 408 of the width 406. In another example, the divider 300 may extend beyond a first half 410 of the width 406.

In some implementations, the divider 300 may form a non-linearity (e.g., a gap 412) within the first side 402. Vias 110 may be oriented to form only the first side 402 and the divider 300 to direct electromagnetic fields 104 from the opening 108 to the aperture 114. In another example, the vias 110 may be oriented to form the first side 402, the divider 300, and the second side 404 to direct electromagnetic fields 104 from the opening 108 to the aperture 114.

The waveguide 100 may further define the aperture 114 as an array of slots 414. The array may include any suitable quantity of slots 414. The divider 300 may divide the array of slots 414 into a first portion 416 and a second portion 418. The first portion 416 may be associated with the first chamber 302, and the second portion 418 may be associated with the second chamber 304. The array of slots 414 may be defined by the first conductive layer 200, the substrate 112, or various combinations thereof.

The divider 300 may have any suitable shape and size. As an example, the divider 300 may have a width similar to that of the opening 108. Additionally or alternatively, the divider 300 may be extended with, e.g., a squared shape, a pointed shape, a rounded shape, a semi-elliptical shape, various other contours, or combinations thereof. Further, the divider 300 may include a linear portion 420 defined by the vias 110. The linear portion 420 may be defined substantially parallel to a portion of the electromagnetic boundary 400. As an example, the linear portion 420 may be substantially parallel to the first side 402, the second side 404, or both.

The divider 300 can also include a non-linear portion 422. The non-linear portion 422 may be formed by the vias 110. Further, the non-linear portion 422 may join the linear portion 420 at a vertex 424. An angle 426 between the linear portion 420 and the non-linear portion 422 may be less than 180 degrees. In some implementations, the angle 426 may be less than 95 degrees. As an example, the linear portion 420 may be substantially orthogonal to the non-linear portion 422 at the vertex 424.

The divider 300 can also include a second non-linear portion 428. The second non-linear portion 428 may be formed by the vias 110. The second non-linear portion 428 may join the linear portion 420 at a second vertex 430. A second angle 432 between the linear portion 420 and the second non-linear portion 428 may be less than 180 degrees. In some implementations, the second angle 432 may also be less than 95 degrees. As an example, the linear portion 420 may be orthogonal to the second non-linear portion 428 at vertex 430.

Figure 5:
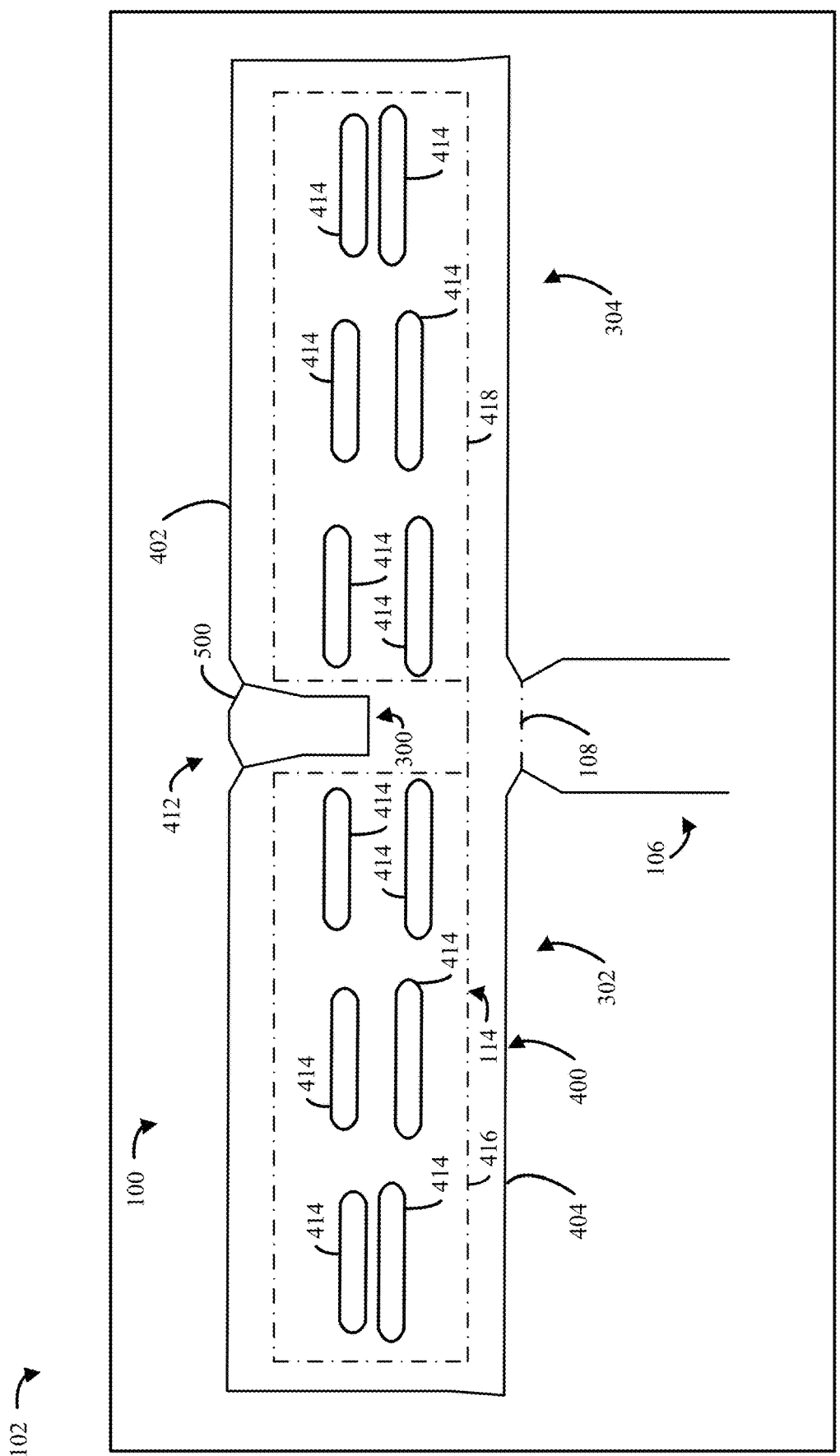
FIG. 5 illustrates a cross-sectional plan view of an example waveguide and bridge, in accordance with one or more implementations of the present disclosure.

Turning to FIG. 5, a top view of an example waveguide 100 and bridge 500, in accordance with one or more implementations of the present disclosure, is shown. The divider 300 may form the gap 412 in the first side 402 of the electromagnetic boundary 400 between the first chamber 302 and the second chamber 304. In aspects, a bridge 500 may be formed across the gap 412 to substantially linearize the non-linearity formed by the gap 412. The bridge 500 may be formed by vias (e.g., vias 110), similar to the divider 300. As an example, a manufactured apparatus 102 may include a plurality of waveguides 100 on the same die. The waveguides 100 may be stacked such that other couplings 106 are formed by the first side 402, directing respective electromagnetic fields 104 between respective couplings 106 and apertures 114. As such, the linearity of the first side 402 may be maintained by the bridge 500, which may reduce perturbances in the electromagnetic fields of adjacent waveguides 100.

Figure 6:
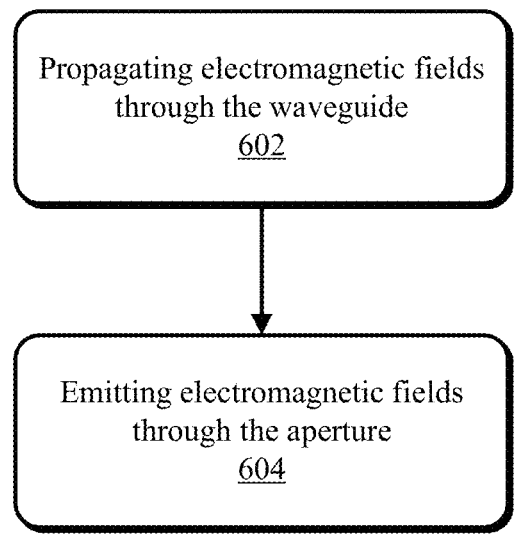
FIG. 6 illustrates a method for utilizing a waveguide, in accordance with one or more implementations of the present disclosure.

Turning to FIG. 6, a method 600 for utilizing a waveguide, in accordance with one or more implementations of the present disclosure is shown. The method 600 is shown as a set of blocks that specify operations and steps performed but are not necessarily limited to the order or combinations shown for performing the operations by the respective blocks. Further, any of one or more of the operations may be repeated, combined, reorganized, omitted, or linked to provide a wide array of additional and/or alternate methods. In portions of the following discussion, reference may be made to the examples of the preceding figures, reference to which is made for example only. The techniques are not limited to performance by one entity or multiple entities operating on one device.

In block 602, electromagnetic fields 104 are propagated through a waveguide (e.g., the waveguide 100 from FIG. 1). In an example, the electromagnetic fields 104 may be driven by a transmitter through a probe or an antenna. Further, the electromagnetic fields 104 may be divided by the divider 300 into respective chambers 302, 304. In block 604, the electromagnetic fields 104 are emitted through the aperture 114. By using the techniques described herein, squinting of the emitted electromagnetic fields 104 may be reduced. In an example, one or more waveguides may be used to propagate electromagnetic fields through the environment 116 from the vehicle 118. As the electromagnetic fields reflect from objects within the beam, they may return to the same waveguides or different waveguides used to receive such reflections. The divider 300 may reduce squint associated with the propagated and received electromagnetic fields, providing increased resolution, precision, and accuracy of the direction and range of the objects within the beam. Although also envisioned for use in other applications, the waveguide 100 may primarily be used to aid in driving the vehicle 118. The vehicle 118 may rely on such information, for example, for speed and orientation control. Indeed, decreasing squinting by even tenths of a degree can improve safety by improving vehicle response times.

Figure 7:
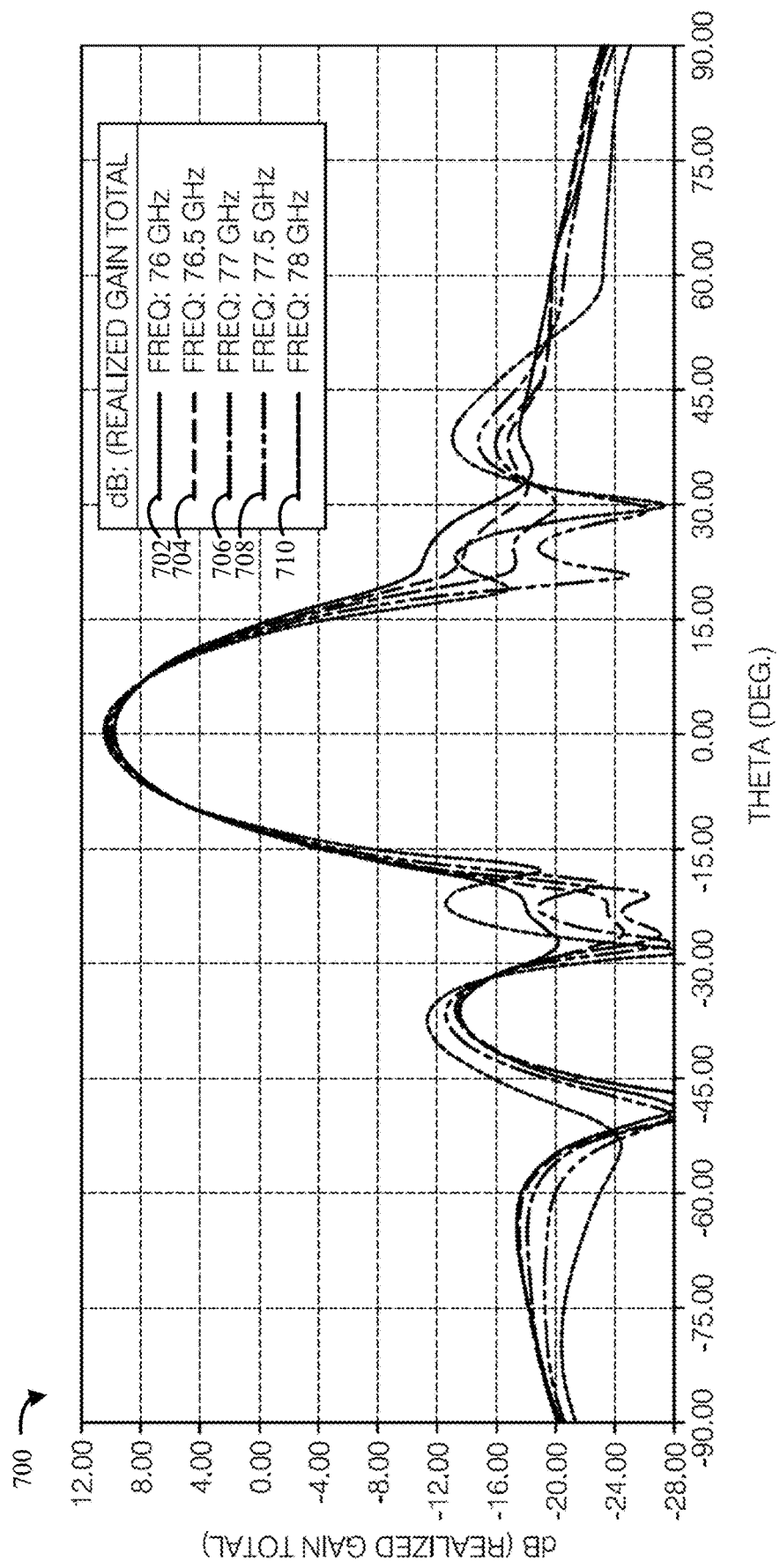
FIG. 7 illustrates a graph depicting results of an example waveguide, in accordance with one or more implementations of the present disclosure.

FIG. 7 illustrates a graph 700 depicting results of an example waveguide, in accordance with one or more implementations of the present disclosure. The graph 700 indicates different radiation patterns for transmitted or received signals within a gigahertz (GHZ) frequency band (e.g., 76 GHz to 78 GHz). As an example, a signal having a frequency of 76 GHz may be transmitted from a waveguide (e.g., waveguide 100) comprising one or more of the techniques described herein with a manufacturing tolerance of three mils for slots (e.g., slots 414) and ten mils for vias (e.g., vias 110). The waveguide response is depicted for five example frequencies: 76 GHz, 76.5 GHz, 77 GHz, 77.5 GHz, and 78 GHz.

For 76 GHz, the squint or deviation from zero theta of the main lobe may be 0.5 degrees with a realized gain of 9.8 decibels (dB). The squint or deviation from zero theta of the main lobe may be 0.4 degrees with a realized gain of 9.9 dB for the 76.5 GHz signal. As another example, the squint or deviation from zero theta of the main lobe may be 0.4 degrees with a realized gain of 10.0 dB for the 77 GHz signal. For the 77.5 GHz signal, the squint or deviation from zero theta of the main lobe may be 0.3 degrees with a realized gain of 10.2 dB. further, the squint or deviation from zero theta of the main lobe may be 0.3 degrees with a realized gain of 10.4 dB for the 78 GHz signal. Indeed, alteration of squint may be provided through the techniques described herein, providing adequate signal transmission characteristics for waveguides within manufacturing tolerances.

EXAMPLES

Example 1. An apparatus, the apparatus comprising a waveguide defining an opening and an aperture, the opening configured to cooperate with a coupling, the aperture exposed to an environment of the waveguide. The waveguide comprising a conductor having a substantially uniform potential with respect to a reference potential defining an electromagnetic boundary. The electromagnetic boundary being arranged to bound electromagnetic fields between the opening and the aperture and configured to define a divider extending toward the opening to divide the electromagnetic boundary into a first chamber and a second chamber.

Example 2. The apparatus of example 1, wherein the electromagnetic boundary defines a first side and a second side, the first side opposite the second side, the opening parallel to the second side and the divider extends from the first side of the electromagnetic boundary toward the opening beyond a first quartile of a width of the electromagnetic boundary that is between the first side and the second side.

Example 3. The apparatus of any preceding example, wherein the divider extends toward the opening beyond a first half of the width of the electromagnetic boundary.

Example 4. The apparatus of any preceding example, wherein the divider forms a gap between the first chamber and the second chamber, the gap forming a non-linearity in the electromagnetic boundary with respect to the first side, the electromagnetic boundary further defining a bridge across the gap to linearize the second side.

Example 5. The apparatus of any preceding example, wherein: the waveguide defines the aperture as an array of slots, and the divider associates a first portion of the array with the first chamber and a second portion of the array with the second chamber.

Example 6. The apparatus of any preceding example, wherein the divider has a linear portion.

Example 7. The apparatus of any preceding example, wherein the linear portion is substantially parallel to a portion of the electromagnetic boundary.

Example 8. The apparatus of any preceding example, wherein the divider has a non-linear portion, the non-linear portion joining the linear portion at a vertex with an angle less than 180 degrees.

Example 9. The apparatus of any preceding example, wherein the linear portion is perpendicular to the non-linear portion at the vertex.

Example 10. The apparatus of any preceding example, wherein the angle is less than 95 degrees.

Example 11. The apparatus of any preceding example, wherein the divider has a second non-linear portion, the second non-linear portion joining the linear portion at a second vertex with a second angle less than 180 degrees.

Example 12. The apparatus of any preceding example, wherein the linear portion is perpendicular to the second non-linear portion at the second vertex.

Example 13. The apparatus of any preceding example, wherein the second angle is less than 95 degrees.

Example 14. The apparatus of any preceding example, wherein the conductor comprises a first layer and a second layer, the first layer being in conductive connection with the second layer by vias conductively connecting the first layer and the second layer to form the substantially uniform potential.

Example 15. The apparatus of any preceding example, wherein the waveguide further comprises a substrate sandwiched between the first layer and the second layer, the substrate providing an electromagnetic conduit between the opening and the second aperture.

Example 16. The apparatus of any preceding example, wherein the substrate is a dielectric material.

Example 17. The apparatus of any preceding example, wherein the conductor is non-contiguous from a plan view cross section perspective and wherein the electromagnetic boundary is contiguous from the plan view cross section perspective.

Example 18. The apparatus of any preceding example, wherein the opening is defined by impedance matching vias of the electromagnetic boundary configured to match an impedance associated with the electromagnetic fields.

Example 19. An apparatus comprising a waveguide defining an opening and an array of slots, the opening configured to cooperate with a coupling and the array of slots being exposed to an environment of the waveguide. The waveguide comprising a conductor having a substantially uniform potential with respect to a reference potential defining a boundary. The boundary arranged to bound electromagnetic fields between the opening and the array of slots and configured to define a divider extending toward the opening to divide the boundary into a first chamber bounding a first portion of the array and a second chamber bounding a second portion of the array.

Example 20. The apparatus of any preceding example, wherein the boundary defines a first side and a second side, the first side opposite the second side, the opening parallel to the second side and the divider extends from the first side of the boundary toward the opening beyond a first quartile of a width of the boundary that is maximum between the first side and the second side.

CONCLUSION

Although implementations of techniques for, and apparatuses or systems enabling, a waveguide with squint alteration have been described in language specific to features and/or methods, it is to be understood that the subject of the appended claims is not necessarily limited to the specific features or methods described. Rather, the specific features and methods are disclosed as example implementations enabling a waveguide with squint alteration.

What is claimed is:

1. An apparatus, the apparatus comprising:
a center-fed slotted waveguide defining an opening and an array of slots, the opening configured to cooperate with a coupling, the array of slots exposed to an environment of the waveguide, the waveguide comprising a conductor having a substantially uniform potential with respect to a reference potential defining an electromagnetic boundary, the electromagnetic boundary:
arranged surrounding the array of slots to bound electromagnetic fields between the opening and the array of slots; and
configured to define a divider extending toward the opening to or past a midpoint of the array of slots, the divider dividing the electromagnetic boundary into a first chamber and a second chamber.

2. The apparatus of claim 1, wherein the divider forms a gap between the first chamber and the second chamber, the gap forming a non-linearity in the electromagnetic boundary with respect to a first side of the electromagnetic boundary.

3. The apparatus of claim 2, wherein the electromagnetic boundary further defines a bridge across the gap to linearize the second side.

4. The apparatus of claim 1, wherein the divider has a linear portion.

5. The apparatus of claim 4, wherein the linear portion is substantially parallel to a portion of the electromagnetic boundary.

6. The apparatus of claim 4, wherein the divider has a non-linear portion, the non-linear portion joining the linear portion at a vertex with an angle less than 180 degrees.

7. The apparatus of claim 6, wherein the linear portion is perpendicular to the non-linear portion at the vertex.

8. The apparatus of claim 6, wherein the angle is less than 95 degrees.

9. The apparatus of claim 6, wherein the divider has a second non-linear portion, the second non-linear portion joining the linear portion at a second vertex with a second angle less than 180 degrees.

10. The apparatus of claim 9, wherein the linear portion is perpendicular to the second non-linear portion at the second vertex.

11. The apparatus of claim 9, wherein the second angle is less than 95 degrees.

12. The apparatus of claim 1, wherein the conductor comprises a first layer and a second layer, the first layer being in conductive connection with the second layer by vias conductively connecting the first layer and the second layer to form the substantially uniform potential.

13. The apparatus of claim 12, wherein the waveguide further comprises a substrate sandwiched between the first layer and the second layer, the substrate providing an electromagnetic conduit between the opening and the array of slots.

14. The apparatus of claim 13, wherein the substrate is a dielectric material.

15. The apparatus of claim 1, wherein the conductor is non-contiguous from a plan view cross-section perspective and wherein the electromagnetic boundary is contiguous from the plan view cross-section perspective.

16. The apparatus of claim 1, wherein the opening is defined by impedance-matching vias of the electromagnetic boundary configured to match an impedance associated with the electromagnetic fields.

17. An apparatus, the apparatus comprising:
a center-fed slotted waveguide defining an opening and an array of slots, the opening configured to cooperate with a coupling and the array of slots being exposed to an environment of the waveguide, the waveguide comprising a conductor having a substantially uniform potential with respect to a reference potential defining a boundary, the boundary:
arranged surrounding the array of slots to bound electromagnetic fields between the opening and the array of slots; and
configured to define a divider extending from a first side of the boundary toward the opening to divide the boundary into a first chamber bounding a first portion of the array and a second chamber bounding a second portion of the array, the divider comprising a linear portion that is parallel to the first side and a plurality of non-linear portions that connect to the linear portion at right angles, extend to the first side, and connect to the first side at oblique angles.

18. The apparatus of claim 17, wherein the divider extends from the first side toward the opening beyond a first quartile of a width of the boundary.

19. The apparatus of claim 18, wherein the divider extends to a first half of the width of the boundary.

20. The apparatus of claim 18, wherein the divider extends beyond a first half of the width of the boundary.

* * * * *